(12) United States Patent
Yano et al.

(10) Patent No.: US 10,872,262 B2
(45) Date of Patent: Dec. 22, 2020

(54) INFORMATION PROCESSING APPARATUS AND INFORMATION PROCESSING METHOD FOR DETECTING POSITION OF OBJECT

(71) Applicant: CANON KABUSHIKI KAISHA, Tokyo (JP)

(72) Inventors: Kotaro Yano, Tokyo (JP); Ichiro Umeda, Tokyo (JP); Muling Guo, Kawasaki (JP); Hiroyuki Uchiyama, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 16/092,875

(22) PCT Filed: Apr. 7, 2017

(86) PCT No.: PCT/US2017/014555
§ 371 (c)(1),
(2) Date: Oct. 11, 2018

(87) PCT Pub. No.: WO2017/179511
PCT Pub. Date: Oct. 19, 2017

(65) Prior Publication Data
US 2019/0205688 A1 Jul. 4, 2019

(30) Foreign Application Priority Data
Apr. 14, 2016 (JP) .................. 2016-081276

(51) Int. Cl.
*G06K 9/32* (2006.01)
*G06K 9/00* (2006.01)
(Continued)

(52) U.S. Cl.
CPC ......... *G06K 9/3241* (2013.01); *G06F 9/3004* (2013.01); *G06K 9/00362* (2013.01);
(Continued)

(58) Field of Classification Search
CPC . G06T 2207/20084; G06T 7/11; G06T 7/168; G06T 7/42; G06T 7/44;
(Continued)

(56) References Cited

U.S. PATENT DOCUMENTS 5,819,016 A * 10/1998 Watanabe ............ G01B 11/002
345/419
9,418,440 B2 8/2016 Sagawa et al.
(Continued)

FOREIGN PATENT DOCUMENTS

JP 2011-100175 A 5/2011

OTHER PUBLICATIONS

International Preliminary Report on Patentability dated Oct. 25, 2018, issued in corresponding International Patent Application No. PCT/JP2017/014555.
(Continued)

*Primary Examiner* — Aklilu K Woldemariam
(74) *Attorney, Agent, or Firm* — Venable LLP (57) ABSTRACT

An information processing apparatus includes an acquiring unit to acquire an input image including an object, an extraction unit to extract a region that has been changed from a background image in the input image, as a changing region, a generating unit to generate a change region image in which a pixel value of each pixel represents whether or not a corresponding pixel in the input image belongs to the changing region, an extraction unit to extract a plurality of feature images from the input image as an output of a neural network by inputting a combination of the input image and the change region image to the neural network, and a detection unit to detect a position of the object from the plurality of feature images.

33 Claims, 4 Drawing Sheets (51) Int. Cl.
*G06K 9/46* (2006.01)
*G06T 7/254* (2017.01)
*G06T 7/194* (2017.01)
*G06T 7/11* (2017.01)
*G06F 9/30* (2018.01)
*G06N 3/02* (2006.01)

(52) U.S. Cl.
CPC .............. *G06K 9/4628* (2013.01); *G06N 3/02* (2013.01); *G06T 7/11* (2017.01); *G06T 7/194* (2017.01); *G06T 7/254* (2017.01); *G06T 2207/20084* (2013.01)

(58) Field of Classification Search
CPC ......... G06T 7/70; G06T 7/0014; G06T 7/194; G06T 2207/20021; G06T 7/143; G06T 7/80; G06T 2207/20076; G06T 7/246; G06T 7/251; G06T 2207/10016; G06T 2207/30201; G06T 7/73; G06T 7/75; G06T 7/337; G06T 17/00; G06T 15/00; G06T 19/20; G06T 2207/10012; G06T 7/74; G06N 3/02; G06K 9/6267; G06K 9/6232; G06K 9/3233; G06K 9/6256; G06K 9/00221; G06K 9/00281; G06K 9/00664; G06K 2009/4666; G06K 9/4671; G06K 9/52; G06K 9/3241; G06K 9/00214; H04N 19/167; H04N 19/172; H04N 13/243; G01B 11/002; G01B 11/24; G06F 3/0304
USPC ......... 348/148; 345/419; 382/103, 118, 156, 382/190
See application file for complete search history.

(56) References Cited

U.S. PATENT DOCUMENTS

| | | | | |
|---|---|---|---|---|
| 9,767,570 B2* | 9/2017 | Li | ................. | G06K 9/00785 |
| 2002/0101506 A1* | 8/2002 | Suzuki | ................. | H04N 13/32 348/51 |
| 2006/0115157 A1* | 6/2006 | Mori | ................. | G06K 9/00315 382/190 |
| 2008/0304707 A1* | 12/2008 | Oi | ................. | G06K 9/72 382/103 |
| 2012/0045095 A1* | 2/2012 | Tate | ................. | G06T 7/75 382/103 |
| 2013/0147790 A1* | 6/2013 | Hildreth | ................. | H04N 13/239 345/419 |
| 2015/0065803 A1* | 3/2015 | Douglas | ................. | G06T 7/11 600/200 |
| 2015/0347831 A1* | 12/2015 | Tamatsu | ................. | G06K 9/00805 382/156 |
| 2017/0140524 A1* | 5/2017 | Karsenti | ................. | G06K 9/6269 |
| 2017/0200264 A1* | 7/2017 | Park | ................. | G06T 7/001 |
| 2017/0213112 A1* | 7/2017 | Sachs | ................. | G06T 7/90 |
| 2017/0220854 A1* | 8/2017 | Yang | ................. | G06K 9/00335 |
| 2018/0075290 A1* | 3/2018 | Chen | ................. | G06K 9/4628 |
| 2018/0157933 A1* | 6/2018 | Brauer | ................. | G06N 3/0454 |

OTHER PUBLICATIONS

Girshick, Ross et al., "Fast R-CNN," IEEE International Conference on Computer Vision, pp. 1440-1448, 2015.
Office Action dated Apr. 14, 2020, issued in corresponding Japanese Patent Application No. 2016081276.
Dalai, Navneet, et al., IEEE Conference on Computer Vision and Pattern Recognition, "Histograms of Oriented Gradients for Human Detection," 2005.
Felzenszwalb, Pedro, et al., IEEE Conference on Computer Vision and Pattern Recognition, "A Discriminatively Trained, Multiscale, Deformable Part Model," 2008.
Girshick, Ross, et al., IEEE Conference on Computer Vision and Pattern Recognition, "Rich feature hierarchies for accurate object detection and semantic segmentation," 2014.
He, Kaiming, et al., "Spatial Pyramid Pooling in Deep Convolutional Networks for Visual Recognition," Computer Vision—ECCV, 2014.
Toshev, Alexander, et al., "DeepPose: Human Pose Estimation via Deep Neural Networks," IEEE Conference on Comptuer Vision and Pattern Recognition, 2014.
Fan, Xiaochuan, et al., "Combining Local Appearance and Holistic View: Dual-Source Deep Neural Networks for Human Pose Estimation," IEEE Conference on Computer Vision and Pattern Recognition, 2015.
Sumi, K., et al., "Object Detection—Model of Foreground and Background," Information Processing Search Report, vol. 2005, No. 88.
Krizhevsky, Alex, et al. "ImageNet Classification with Deep Convolutional Neural Networks," Advances in Neural Information Processing Systems, 2012.
Ren, Shaoqing, et al. "Faster R-CNN: Towards Real-Time Object Detection with Region Proposal Networks," 2015.
Li, Fuxin, et al., "Object Recognition as Ranking Holistic Figure-Ground Hypotheses," IEEE Conference on Computer Vision and Pattern Recognition, 2010.
Jain, Arjun, et al.; "MoDeep: A Deep Learning Framework Using Motion Features for Human Pose Estimation," Network and Parallel Computing, Springer International Publishing, Jan. 1, 2015.
Tekin, Bugra, et al., "Prediciting People's 3D Poses from Short Sequences," URL:http//arxiv.org/pdf/1504.08200v3.pdf, retrieved Jun. 2, 2017.
Huang, Yichao, et al., "DeepFinger: A Cascade Convolutional Neuron Network Approach to Finger Key Point Detectio in Egocentric Vision with Mobile Camera," IEEE International Conference on Systems, Man, and Cybernetics, 2015.
International Search Report and Written Opinion dated Jul. 3, 2017, issued in corresponding International Application No. PCT/JP2017/014555.
Office Action dated Aug. 4, 2020, issued in corresponding Japanese Patent Application No. 2016081276.

\* cited by examiner

INFORMATION PROCESSING APPARATUS AND INFORMATION PROCESSING METHOD FOR DETECTING POSITION OF OBJECT

This application is a U.S. national stage application of PCT International Application No. PCT/JP2017/014555, filed Apr. 7, 2017, which claims priority from Japanese Patent Application No. 2016/081276, filed Apr. 14, 2016.

TECHNICAL FIELD

The present invention relates to an information processing apparatus and an information processing method that detect the position of an object from an image photographed by an imaging device, or the like.

BACKGROUND ART

In recent years, installation of monitoring (surveillance) cameras in stores and shops has rapidly spread for security. Also, there has been proposed a method of using the cameras like that for marketing research of the stores and the shops by not only acquiring video images, but also, detecting persons in the video images to measure a degree of congestion and to analyze flow lines (or traffic lines) of the persons. Besides, in marketing applications, there are requests to analyze the movements of a person photographed and captured by the camera, and to further analyze, based on the analyzed movements of the person, interest-based behavior of the person, such as picking-up of merchandise put and displayed in the stores and the shops.

To perform such video image analysis as described above, a technique of automatically detecting the position of a person in an image, parts such as the head, the hand, and the like, of the person, or the position of the joints of the person is required. As a representative method of detecting a person from an image, there is known the method proposed by Dalal and Triggs, "Histograms of oriented gradients for human detection," IEEE Conference on Computer Vision and Pattern Recognition (CVPR), 2005. In this method, the gradient direction histogram feature is extracted from the image, and it is discriminated, by the support vector machine, whether or not the extracted feature is equivalent to a person. Besides, in Felzenszwalb, McAllester, and Ramanan, "A Discriminatively Trained, Multiscale, Deformable Part Model," IEEE Conference on Computer Vision and Pattern Recognition (CVPR), 2008, the method of estimating the position of the part of a person by extending the method described in Dalal and Triggs, "Histograms of oriented gradients for human detection," IEEE Conference on Computer Vision and Pattern Recognition (CVPR), 2005 with a deformed part model is proposed.

On the other hand, a deep neural network has attracted attention in recent years as a technique for image recognition. More specifically, in Girshick, Donahue, Darrell, and Malik, "Rich Feature Hierarchies for Accurate Object Detection and Semantic Segmentation," IEEE Conference on Computer Vision and Pattern Recognition (CVPR), 2014, and He, Zhang, Ren, and Sun, "Spatial Pyramid Pooling in Deep Convolutional Networks for Visual Recognition," Computer Vision—ECCV 2014, there is proposed a method of extracting a feature from an image by a convolutional neural network, and discriminating and detecting various objects such as a person, a car, a bird, and the like, from the extracted feature. Besides, in Toshev and Szegedy, "DeepPose: Human Pose Estimation via Deep Neural Networks," IEEE Conference on Computer Vision and Pattern Recognition (CVPR), 2014, and Fan, Zheng, Lin, and Wang, "Combining local appearance and holistic view: Dual-source deep neural networks for human pose estimation," IEEE Conference on Computer Vision and Pattern Recognition (CVPR), 2015, the method of detecting the joint position of a person is proposed. The method using the deep neural network like this is characteristic as compared with the method proposed by Dalal and Triggs, "Histograms of oriented gradients for human detection," IEEE Conference on Computer Vision and Pattern Recognition (CVPR), 2005, and Felzenszwalb, McAllester, and Ramanan, "A Discriminatively Trained, Multiscale, Deformable Part Model," IEEE Conference on Computer Vision and Pattern Recognition (CVPR), 2008, in the point that the feature extracting has diversity. Moreover, in the method using the deep neural network like this, since the feature extracting and the discrimination of the extracted features can be optimized entirely by machine learning, recognition accuracy is dramatically improved.

However, even in the case of detecting an object using the image recognition by the deep neural network, it is difficult to detect an object, such as a person, that variously changes depending on its joints. This is because the background portion in an image changes due to the change in shape of the object, and such a change affects. In particular, when the background is complicated, detection accuracy is seriously deteriorated.

Solution to Problem

According to one aspect, the present invention provides an information processing apparatus that comprises an acquiring unit configured to acquire an input image including an object, a first extracting unit configured to extract, from the input image, a change region image that is an image of a changing region, a second extracting unit configured to extract a plurality of feature images from the input image and the change region image, and a detecting unit configured to detect a position of the object from the plurality of feature images.

Further features of the present invention will become apparent from the following description of exemplary embodiments with reference to the attached drawings.

BRIEF DESCRIPTION OF DRAWINGS

FIG. 2 is a block diagram for describing an example of a functional constitution of the information processing apparatus, and the like.

DESCRIPTION OF EMBODIMENTS

Preferred embodiments of the present invention will now be described in detail in accordance with the accompanying drawings.

First Embodiment

Figure 1:
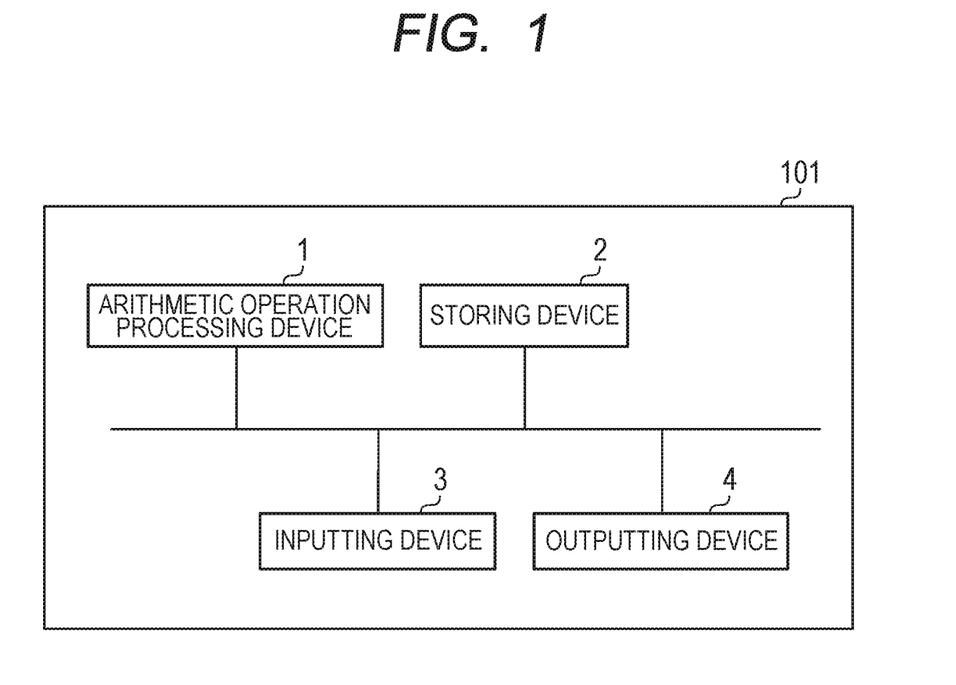
FIG. 1 is a block diagram for describing an example of a hardware constitution of an information processing apparatus.

FIG. 1 is a block diagram for describing a hardware constitution of an information processing apparatus 101 according to the present embodiment. The information processing apparatus 101 comprises an arithmetic operation processing device 1, a storing device 2, an inputting device 3, and an outputting device 4. Incidentally, the respective devices included in the information processing apparatus 101 are configured to be able to mutually communicate with others, and these devices are connected by a bus, or the like.

The arithmetic operation processing device 1 controls the operation of the information processing device 101 to execute programs stored in the storing device 2. The arithmetic operation processing device 1 is constituted by a CPU (central processing unit), a GPU (graphics processing unit, and the like. The storing device 2, which is a storage device, such as a magnetic storing device, a semiconductor memory, or the like, stores therein the program to be executed by the arithmetic operation processing device 1, data to be stored for a long time, and the like. In the present embodiment, the arithmetic operation processing device 1 performs processes according to the procedure of the program stored in the storing device 2, so that functions of the information processing device 101 later-described with reference to FIG. 2 and processes related to a later-described flow chart of FIG. 3 are achieved. The storing device 2 also stores therein images, detection results and the like to be processed by the information processing device 101.

The inputting device 3, which is an inputting device such as a mouse, a keyboard, a touch panel device, a button, or the like, is used for inputting various instructions. Further, the inputting device 3 comprises a communicating unit for inputting a photographed image acquired by a camera, or the like, to the information processing apparatus 101. The outputting device 4, which is a liquid crystal panel, an external monitor, or the like, is used for outputting various kinds of information.

Incidentally, it should be noted that the hardware constitution of the information processing apparatus 101 is not limited to the constitution illustrated in FIG. 1. For example, the information processing apparatus 101 may comprise an I/O (inputting/outputting) device for performing communication with various devices. More specifically, the I/O device is an inputting/outputting unit, such as a memory card, a USB (universal serial bus) cable, or the like, a transmission/reception unit using a wired or wireless communication system, or the like.

Figure 2:
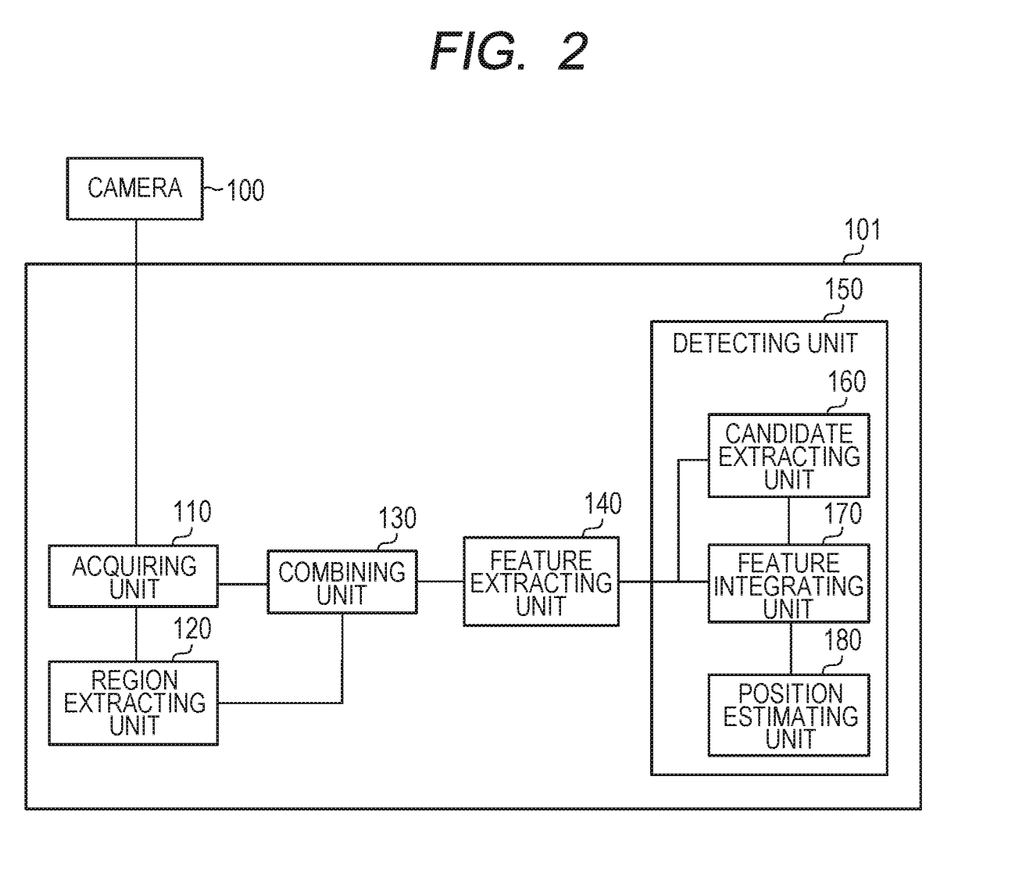
Figure 3:
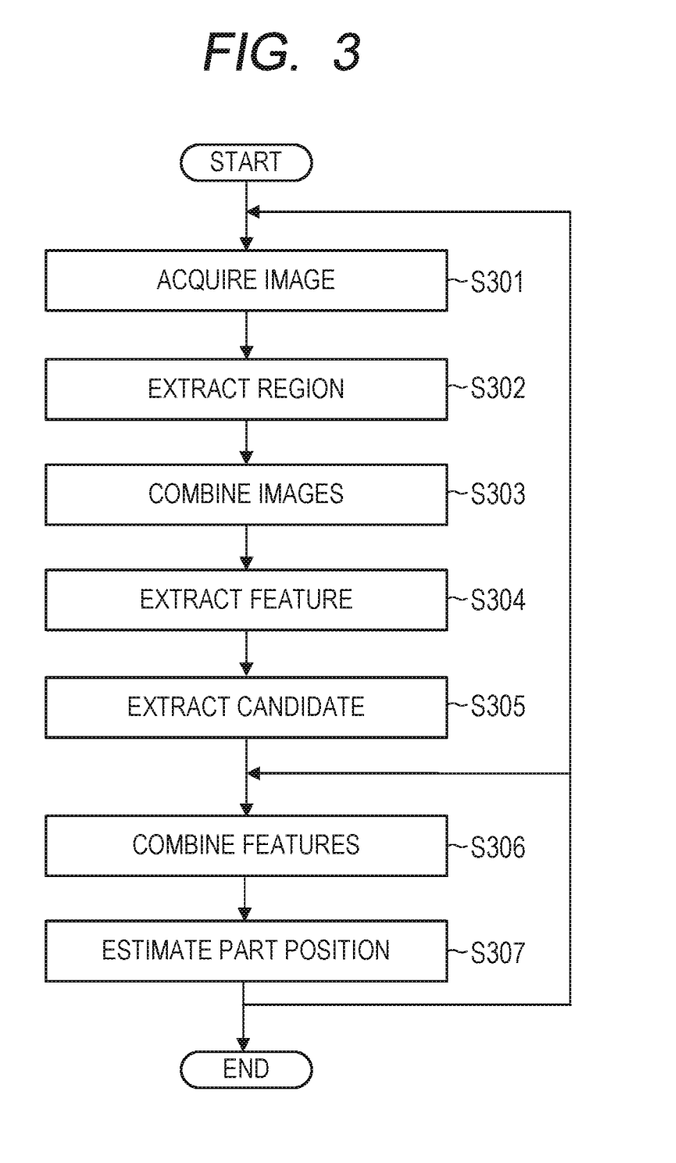
FIG. 3 is a flow chart for describing an example of the process of the information processing apparatus.

FIG. 2 is a block diagram for describing an example of the functional constitution of the information processing apparatus 101 according to the present embodiment. The information processing apparatus 101 comprises an acquiring unit 110, a region extracting unit 120, a combining unit 130, a feature extracting unit 140, and a detecting unit 150. Here, the processes and the functions of the information processing apparatus 101 are realized by the functional components 110 to 150 illustrated in FIG. 2.

In the present embodiment, a process of detecting each part, such as the head, the hand, or the like, of a person to be monitored as a recognition target from an image photographed with a fixed visual field by a camera 100 will be described.

The camera 100 photographs the person to be monitored.

The acquiring unit 110 acquires an image photographed and captured by the camera 100 from the camera 100 via a not-illustrated communicating unit. Then, the acquiring unit 110 stores the acquired image in the storing device 2.

The region extracting unit 120 extracts, as a change region image, a region that changes from the image acquired by the acquiring unit 110.

The combining unit 130 combines the image acquired by the acquiring unit 110 with the change region image extracted by the region extracting unit 120.

The feature extracting unit 140 extracts a plurality of feature images from the resultant image acquired as a result of the combining by the combining unit 130.

The detecting unit 150 detects the position of a part of an object (a person in the present embodiment) to be recognized, from the plurality of feature images extracted by the feature extracting unit 140. As illustrated in FIG. 2, the detecting unit 150 comprises a candidate extracting unit 160, a feature integrating unit 170 and a position estimating unit 180.

The candidate extracting unit 160 extracts the position of a region to be a candidate for a person region that is a region where the person exists, from the plurality of feature images extracted by the feature extracting unit 140.

The feature integrating unit 170 extracts features from the plurality of feature images extracted by the feature extracting unit 140, based on the region position extracted by the candidate extracting unit 160. Then, the feature integrating unit 170 integrates the extracted features to output an integrated feature.

The position estimating unit 180 estimates the position of the part of the person from the integrated feature extracted by the feature integrating unit 170.

Hereafter, a process according to the present embodiment will be described with reference to the flow chart illustrated in FIG. 3.

Namely, FIG. 3 is the flow chart for describing an example of the process of the information processing apparatus 101 according to the present embodiment. In step S301, the acquiring unit 110 acquires the image photographed by the camera 100 from the camera 100. The image acquired in step S301 is equivalent to, for example, bitmap data expressed by eight bits for each of RGB. The camera 100, of which the visual field has been fixed, photographs time-series images that are images continuous at a set interval on a time series. Since the visual field has been fixed, the background of the images photographed by the camera 100 are similar. The acquiring unit 110 acquires the time-series images of substantially the same visual field from the camera 100. The acquiring unit 110 may reduce in size the acquired image at set magnification. By doing so, the acquiring unit 110 can reduce the amount of calculation processed by the information processing apparatus 101. Then, the acquiring unit 110 stores the acquired image in the storing device 2.

In step S302, the region extracting unit 120 extracts, as the change region image, the region that changes from the image acquired in step S301. In the present embodiment, the region extracting unit 120 extracts the change region image by using a background difference method. More specifically, the region extracting unit 120 previously acquires images of only background photographed by the camera 100 and not including a person, for a plurality of frames, and creates background images from the acquired images. The region extracting unit 120 compares the image acquired by the acquiring unit 110 and the previously created background image with each other for each pixel, and, based on a difference therebetween for each pixel, determines whether or not the pixel is the pixel of the change region.

For example, if the absolute value of the difference of each pixel between the image acquired by the acquiring unit 110 and the previously created background image is equal to or greater than a set threshold value, the region extracting unit 120 determines that the relevant pixel is the pixel in the change region. On the other hand, if the absolute value of the difference of each pixel is lower than the threshold value, the region extracting unit 120 determines that the relevant pixel is not the pixel of the change region. Then, for example, the region extracting unit 120 extracts, as the change region image, a binary image in which the pixel value of the pixel in the change region is one and the pixel value of the pixel in the region other than the change region is zero. In addition, the region extracting unit 120 may update the background image based on a result of distinguishing the pixel of the change region from other pixels. In addition to such a method of extracting the change region image due to the background difference as described above, the region extracting unit 120 may use various methods as described in Washimi, Seki, Namibe, "Object Detection—Modeling of Background and Detection Target," Information Processing Society Research Report (CVIM), Vol. 2005, No. 88.

In step S303, the combining unit 130 combines the image acquired by the acquiring unit 110 in step S301 with the change region image extracted by the region extracting unit 120 in step S302. More specifically, the combining unit 130 generates an image having a total of four channels by including one channel of the content of the change region image in the image having the RGB three channels acquired in step S301. The combined image is composed of the four channels of eight bits for each of RGB and one bit for the change region image, and the pixel of each channel is associated with the same target of the photographed scene.

In step S304, the feature extracting unit 140 extracts the plurality of feature images from the image combined and acquired in step S303. The feature extracting unit 140 extracts the feature image by using a convolutional neural network. For example, the feature extracting unit 140 extracts the feature image by using the five-layer convolutional neural network on the input side of the neural network proposed in Krizhevsky, Sutskever, and Hinton, "ImageNet classification with deep convolutional neural networks," Advances in Neural Information Processing Systems 25 (NIPS 2012). The convolutional neural network is also disclosed in Girshick, Donahue, Darrell, and Malik, "Rich Feature Hierarchies for Accurate Object Detection and Semantic Segmentation," IEEE Conference on Computer Vision and Pattern Recognition (CVPR), 2014, and He, Zhang, Ren, and Sun, "Spatial Pyramid Pooling in Deep Convolutional Networks for Visual Recognition," Computer Vision—ECCV 2014. However, in the present embodiment, as well as He, Zhang, Ren, and Sun, "Spatial Pyramid Pooling in Deep Convolutional Networks for Visual Recognition," Computer Vision—ECCV 2014, the feature extracting unit 140 performs the process by the neural network according to the size of the input image, and performs pooling of the feature image (that is, the processed result is temporarily stored in the storing device). Further, in the present embodiment, unlike the conventional method, since the feature extracting unit 140 inputs the image composed of the four channels acquired in step S303 to the first layer of the convolutional neural network, the number of the input channels is 4. The feature extracting unit 140 performs the process of the convolutional neural network by using the GPU of the arithmetic operation processing device 1.

Figure 4:
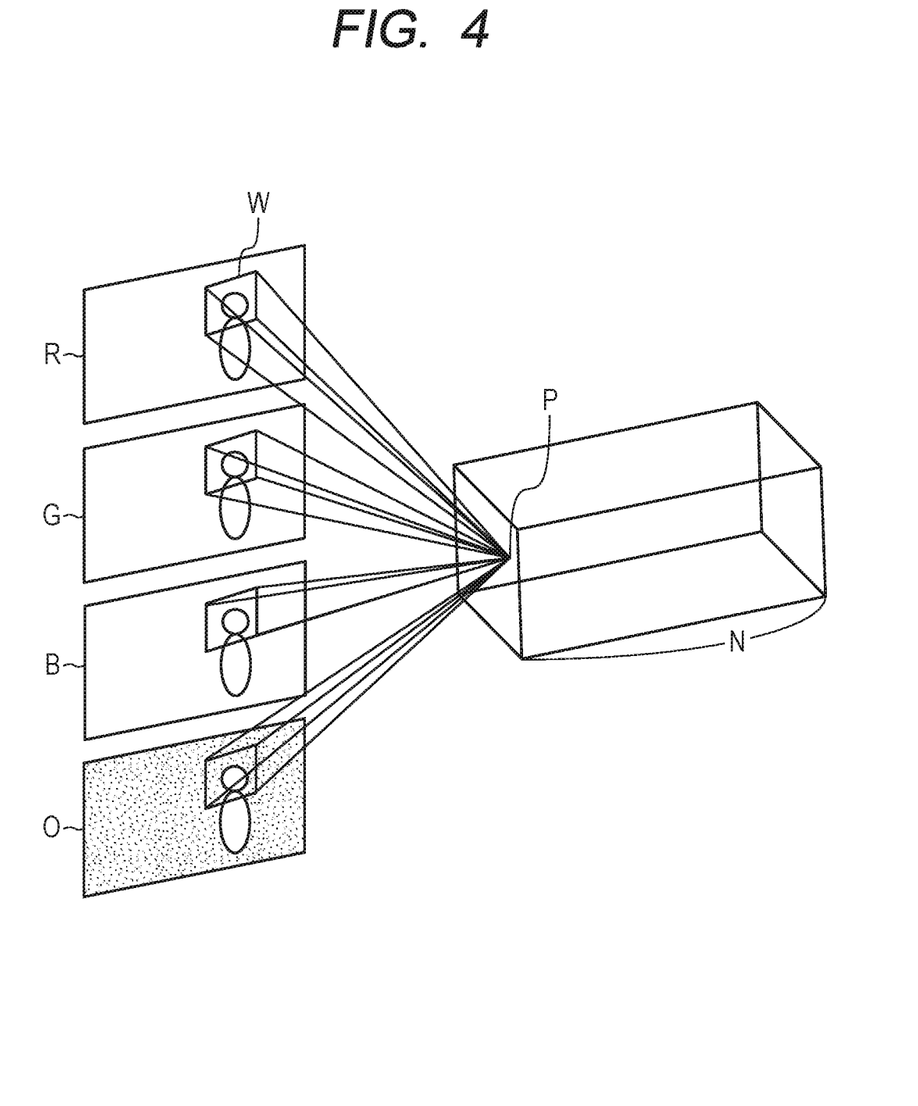
FIG. 4 is a diagram for describing a process of a convolutional neural network.

FIG. 4 is a diagram for describing a process of the convolutional neural network. Hereafter, the process of the convolutional neural network used by the feature extracting unit 140 in step S304 of the present embodiment will be described with reference to FIG. 4. In FIG. 4, R, G, and B are respectively the images of the R, G and B channels of the image acquired by the acquiring unit 110 in step S301. Further, O is the change region image extracted in step S302 by the region extracting unit 120. The feature extracting unit 140 performs the following process in the first layer on the input side of the convolutional neural network. That is, the feature extracting unit 140 performs a convolution arithmetic operation by using filters set for a partial region W at the same position from the respective images of R, G, B, and O, and acquires the value of the position of a point P corresponding to the partial region W in the feature image being the output of the convolution arithmetic operation. As the set filter, for example, a kernel coefficient of size 11×11 or the like is used. In FIG. 4, a symbol N represents the number of output channels, for example, ninety-six channels. The kernel coefficient of the convolution arithmetic operation is different for each input/output channel. These kernel coefficients are acquired by learning in advance. The feature extracting unit 140 uses the output from the previous layer as inputs for the second and subsequent layers of the convolutional neural network.

In the present embodiment, the feature extracting unit 140 inputs, to the convolutional neural network, the change region image in which the change region pixel is one and the other pixels are zero, as the fourth channel of the image combined in step S303. Therefore, it is possible to expect a suppression effect for the feature extracted from the pixel other than the change region, and it is possible for the feature extracting unit 140 to suppress an influence of the image of the background portion. In the present embodiment, the convolutional neural network outputs the feature images of 256 channels.

In step S305, the candidate extracting unit 160 extracts the position of the region to be a candidate for a person region from the plurality of feature images extracted by the feature extracting unit 140 in step S304. The candidate extracting unit 160 uses an RPN (Region Proposal Networks) proposed in, for example, Ren, He, Girshick, and Sun, "Faster R-CNN: Towards Real-Time Object Detection with Region Proposal Networks," arXiv: 1506.01497, 2015. The RPN is equivalent to a method of outputting object likeliness and non-object likeliness as discrimination scores. In the present embodiment, it is learned in advance to output scores of human likeness and non-human likeness. Also, the RPN outputs the rectangle coordinates of 3 scale×3 aspect ratio by regression (or return). In the present embodiment, only the vertically long 1:2 aspect ratio is output assuming an output of the candidate region of person standing. Then, the candidate extracting unit 160 outputs the discrimination scores of the human likeness and the non-human likeness by the RPN, and stores, in the storing device 2, the rectangular coordinates of the region candidate of which the discrimination score of the human likeness is equal to or higher than a set threshold value, as a candidate region position.

In step S306, the feature integrating unit 170 extracts the features from the plurality of feature images extracted by the feature extracting unit 140 in step S304, for the respective candidate region positions extracted by the candidate extracting unit 160 in step S305, and then, integrates the extracted features. The feature integrating unit 170 performs a feature integrating process by spatial pyramid pooling proposed in He, Zhang, Ren, and Sun, "Spatial Pyramid Pooling in Deep Convolutional Networks for Visual Recognition," Computer Vision—ECCV 2014, for example. The feature integrating unit 170 extracts the feature at the region position extracted by the candidate extracting unit 160 in step S305, from the feature images of 256 channels extracted by the feature extracting unit 140 in step S304.

Then, based on the extracted feature, the feature integrating unit 170 acquires the sum of the features of the regions divided into sixteen, the features of the regions divided into four, and the features of the entire region, for each channel. The feature integrating unit 170 outputs, as the integrated feature, the feature acquired by integrating feature vectors having the acquired values as components.

In step S307, the position estimating unit 180 estimates the position of the part of the person from the integrated feature extracted by the feature integrating unit 170 in step S306. In the present embodiment, the position estimating unit 180 estimates the positions of, for example, seven parts of the person's head, the left and right shoulders, the left and right elbows, and the centers of the wrists. For example, the position estimating unit 180 inputs the integrated feature extracted by the feature integrating unit 170 in step S306, to a fully connected neural network, such as the sixth layer to the eighth layer of the neural network proposed in Fan, Zheng, Lin, and Wang, "Combining local appearance and holistic view: Dual-source deep neural networks for human pose estimation," IEEE Conference on Computer Vision and Pattern Recognition (CVPR), 2015. The position estimating unit 180 provides the two layers of the fully connected neural networks respectively outputting 4096 dimensional features and the neural network returning the position coordinates from the output 4096 dimensional features, for each part of the person to be detected. In addition, the position estimating unit 180 provides the neural network that outputs a heat map representing the likelihood of each part for each part. The output heat map, which can be considered as visualizing appearance probability of the object to be detected, is an example of an appearance probability image showing the appearance probability of the object. The fully connected neural network used by the position estimating unit 180 is previously learned using a large number of person images and the position coordinates of the parts of the persons in the person images.

The position estimating unit 180 outputs the position where the output of the heat map is equal to or greater than a predetermined value as the detection result for each part of the person. For example, the position estimating unit 180 superposes a rectangle surrounding the detected part on an image, and displays them on the displaying unit, or the like, of the outputting device 4. Further, the position estimating unit 180 may display the values of the coordinates of the detected part on the displaying unit, or the like, of the outputting device 4. Furthermore, the position estimating unit 180 may generate the appearance probability image showing the heat map, and output the generated appearance probability image to the displaying unit, or the like, of the outputting device 4.

Besides, the position estimating unit 180 can also detect the region including all the regions of the respective parts of the detected object as the position of the object. The position estimating unit 180 may output the position of the detected object. For example, the position estimating unit 180 superposes a rectangle surrounding the detected object on an image, and displays them on the displaying unit, or the like, of the outputting device 4.

The process using the RPN by the candidate extracting unit 160 in step S305 and the process using the fully connected neural network by the position estimating unit 180 in step S307 are performed by the GPU of the arithmetic operation processing device 1.

The arithmetic operation processing device 1 repeatedly performs the processes of step S306 and step S307 for each of the candidate region positions extracted by the candidate extracting unit 160 in step S305. Further, the arithmetic operation processing device 1 repeatedly performs the processes of steps S302 to S307 for each of the images acquired by the acquiring unit 110 in step S301. Then, in response to an input indicating a process end based on a user's operation via the inputting device 3, the arithmetic operation processing device 1 ends the process of FIG. 3.

As described above, according to the process of the present embodiment, the information processing apparatus 101 can suppress the influence of the image of the background portion by extracting the feature by the neural network from the image photographed by the camera 100 and the change region image. Therefore, the information processing apparatus 101 can detect the object with high accuracy even in the situation when the background is complicated, for example. That is, the information processing apparatus 101 can improve the detection accuracy of the object. Further, the information processing apparatus 101 can detect the positions of the plurality of parts of the object from the plurality of feature images extracted by the feature extracting unit 140.

In the present embodiment, even if the background image is input to the neural network instead of the change region image, it is possible for the information processing apparatus 101 to expect the effect of suppressing the influence of the image of the background portion. However, since the number of input channels to the neural network used by the feature extracting unit 140 becomes greater than that for the change region image, the constitution of the feature extracting unit 140 becomes complicated.

In the present embodiment, the region extracting unit 120 extracts the change region image by using the background difference method in step S302. However, it is also possible to extract the change region image by a method other than the background difference method. For example, the region extracting unit 120 may extract the change region image by using an interframe difference. That is, the region extracting unit 120 may compare the images included in the plurality of continuous images on the time series acquired in step S301, and extract the image of the difference as the change region image. Besides, the region extracting unit 120 may extract the person region in the image instead of the change region image, and extract a binary image in which the person region pixel is set to one and the other pixels are set to zero. The feature extracting unit 140 may extract the feature image from the image from the camera 100 and the binary image of the person region. Thus, the information processing apparatus 101 can reduce the influence of the background on the detection accuracy even when the person who is the object to be detected does not move. As a method of extracting the person region, there is a method as proposed in Li, Carreira, and Sminchisescu, "Object Recognition as Ranking Holistic Figure—Ground Hypotheses," IEEE Conference on Computer Vision and Pattern Recognition (CVPR), 2010, of dividing an image into similar pixels called superpixels, extracting the feature for each superpixel, and thus discriminating whether or not the target image is equivalent to a person region. Besides, as another method of extracting the person region, there is a method of photographing a person in parallel by the camera 100 and another camera having the visual field overlapping the visual field of the camera 100, acquiring a distance image from the two photographed images, and extracting the person region from the acquired distance image.

In the present embodiment, the information processing apparatus 101 performs the process of detecting the position of the part of the person being the object to be detected from the image. However, the information processing apparatus 101 can also detect a portion of an object such as an animal, or the like, other than a person.

According to the above embodiments, it is possible to further improve the detection accuracy of the object which deforms or changes variously.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

We claim:

1. An information processing apparatus comprising:
(A) one or more processors; and
(B) at least one memory coupled to the one or more processors, the at least one memory having stored thereon instructions that, when executed by the one or more processors, cause the apparatus:
(a) to acquire an input image including an object;
(b) to extract a region that has been changed from a background image in the input image, as a changing region, a binary image in which each pixel value is one or zero and the pixel value of the pixel in the change region is different from the pixel value of the pixel in the region other than the change region;
(c) to generate a change region image in which a pixel value of each pixel represents whether or not a corresponding pixel in the input image belongs to the changing region;
(d) to extract a plurality of feature images from the input image as an output of a neural network by inputting a combination of the input image and the change region image to the neural network; and
(e) to detect a position of the object from the plurality of feature images.

2. The information processing apparatus according to claim 1, wherein the changed region image is extracted based on the input image and a background image.

3. The information processing apparatus according to claim 1, wherein the instructions, when executed by the one or more processors, further cause the apparatus:
(f) to acquire a plurality of images that are continuous on a time series and each of which does not include the object; and
g) to generate the background image based on the plurality of images that are continuous on the time series and each of which does not include the object.

4. The information processing apparatus according to claim 3, wherein the plurality of images that are continuous on the time series are photographed in a fixed visual field.

5. The information processing apparatus according to claim 1, wherein the plurality of feature images are extracted by combining the input image with the change region image and using a convolutional neural network.

6. The information processing apparatus according to claim 1, wherein a candidate region is a candidate for a region where the object exists in the input image, features of the plurality of feature images are based on the candidate region, and the position of the object is based on the integrated features.

7. The information processing apparatus according to claim 1, wherein the object is detected from the plurality of feature images by using a fully connected neural network.

8. The information processing apparatus according to claim 1, wherein the instructions, when executed by the one or more processors, further cause the apparatus:
(f) to detect respective positions of a plurality of predetermined portions of the object; and
(g) estimate a position of the object by integrating detection results of the respective positions of the plurality of predetermined parts of the object.

9. The information processing apparatus according to claim 1, wherein the instructions, when executed by the one or more processors, further cause the apparatus (f) to output a detection result.

10. The information processing apparatus according to claim 9, wherein the instructions, when executed by the one or more processors, further cause the apparatus:
(g) to generate an appearance probability image indicating appearance probability of the object from the plurality of feature images; and
(h) to output the generated appearance probability image.

11. An information processing method comprising:
(a) acquiring an input image including an object;
(b) extracting a region that has been changed from a background image in the acquired input image, as a changing region, a binary image in which each pixel value is one or zero and the pixel value of the pixel in the change region is different from the pixel value of the pixel in the region other than the change region;
(c) generating a change region image in which a pixel value of each pixel represents whether or not a corresponding pixel in the input image belongs to the changing region;
(d) extracting a plurality of feature images from the acquired input image as an output of a neural network by inputting a combination of the input image and the extracted change region image to the neural network; and (e) detecting a position of the object from the plurality of extracted feature images.

12. The information processing method according to claim 11, wherein the change region image is extracted based on the input image and a background image.

13. The information processing method according to claim 11, further comprising:
   (f) acquiring a plurality of images that are continuous on a time series and each of which does not include the object; and
   (g) generating the background image based on the plurality of images that are continuous on the time series and each of which does not include the object.

14. The information processing method according to claim 11, wherein the plurality of images that are continuous on the time series are photographed in a fixed visual field.

15. The information processing method according to claim 11, wherein the plurality of feature images are extracted by combining the input image with the change region image and using a convolutional neural network.

16. The information processing method according to claim 11, wherein a candidate region is a candidate for a region where the object exists in the input image, features of the plurality of feature images are based on the candidate region, and the position of the object is based on the integrated features.

17. The information processing method according to claim 11, wherein the object is detected from the plurality of feature images by using a fully connected neural network.

18. The information processing method according to claim 11, further comprising:
   (f) detecting respective positions of a plurality of predetermined portions of the object; and
   (g) estimating a position of the object by integrating detection results of the respective positions of the plurality of predetermined parts of the object.

19. The information processing method according to claim 11, further comprising (f) outputting a detection result.

20. The information processing method according claim 19, further comprising:
   (g) generating an appearance probability image indicating appearance probability of the object from the plurality of feature images; and
   (h) outputting the generated appearance probability image generated by the detecting step.

21. A non-transitory computer-readable storage medium that stores a program for causing a computer to perform:
   acquiring an input image including an object;
   extracting a region that has been changed from a background image in the acquired input image, as a changing region, a binary image in which each pixel value is one or zero and the pixel value of the pixel in the change region is different from the pixel value of the pixel in the region other than the change region;
   generating a change region image in which a pixel value of each pixel represents whether or not a corresponding pixel in the input image belongs to the changing region;
   extracting a plurality of feature images from the acquired input image as an output of a neural network by inputting a combination of the input image and the extracted change region image to the neural network; and
   detecting a position of the object from the plurality of extracted feature images.

22. The storage medium according to claim 21, wherein the change region image is extracted based on the input image and a background image.

23. The storage medium according to claim 21, in which the medium stores a program for causing a computer further to perform:
   acquiring a plurality of images that are continuous on a time series and each of which does not include the object; and
   generating the background image based on the plurality of images that are continuous on the time series and each of which does not include the object.

24. The storage medium according to claim 21, wherein the plurality of images that are continuous on the time series are photographed in a fixed visual field.

25. The storage medium according to claim 21, wherein the plurality of feature images are extracted by combining the input image with the change region image and using a convolutional neural network.

26. The storage medium according to claim 21, wherein a candidate region is a candidate for a region where the object exists in the input image, features of the plurality of feature images are based on the candidate region, and the position of the object is based on the integrated features.

27. The storage medium according to claim 21, wherein the object is detected from the plurality of feature images by using a fully connected neural network.

28. The storage medium according to claim 21, in which the medium stores a program for causing a computer further to perform:
   detecting respective positions of a plurality of predetermined portions of the object; and
   estimating a position of the object by integrating detection results of the respective positions of the plurality of predetermined parts of the object.

29. The storage medium according to claim 28, in which the medium stores a program for causing a computer further to perform outputting a detection result.

30. The storage medium according to claim 29, wherein the detecting step is configured to further generate an appearance probability image indicating appearance probability of the object from the plurality of feature images, and the outputting step is configured to further output the appearance probability image generated by the detecting step.

31. The information processing apparatus according to claim 8, wherein a region that includes the respective positions of the plurality of predetermined parts of the object is estimated as the position of the object.

32. The information processing method according to claim 18, wherein a region that includes the respective positions of the plurality of predetermined parts of the object is estimated as the position of the object.

33. The storage medium according to claim 28, wherein a region that includes the respective positions of the plurality of predetermined parts of the object is estimated as the position of the object.

* * * * *